(12) United States Patent
Pawar

(10) Patent No.: US 10,119,520 B2
(45) Date of Patent: Nov. 6, 2018

(54) ROTOR BLADE FOR A WIND TURBINE

(71) Applicant: Siemens Aktiengesellschaft, Munich (DE)

(72) Inventor: Ashish Pawar, Aalborg (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 170 days.

(21) Appl. No.: 14/622,834

(22) Filed: Feb. 14, 2015

(65) Prior Publication Data

US 2015/0275857 A1 Oct. 1, 2015

(30) Foreign Application Priority Data

Mar. 31, 2014 (EP) .................................. 14162704

(51) Int. Cl.
F03D 1/06 (2006.01)
(52) U.S. Cl.
CPC ......... F03D 1/0683 (2013.01); F03D 1/0675 (2013.01); *F05B 2280/702* (2013.01); *Y02E 10/721* (2013.01)
(58) Field of Classification Search
CPC .............. F03D 1/0683; F03D 1/0675; F05B 2280/702; F05B 2280/6008; F05B 2280/4003; F05B 2280/60; F05B 2280/6003; F05B 2280/6013; Y02E 10/721; Y02E 10/72
USPC ...................... 416/229, 230, 241; 290/44, 55
See application file for complete search history.

(56) References Cited

U.S. PATENT DOCUMENTS

| | | | | |
|---|---|---|---|---|
| 4,339,230 | A * | 7/1982 | Hill | B64C 27/473 416/226 |
| 4,976,587 | A * | 12/1990 | Johnston | B64C 27/473 416/226 |
| 8,753,091 | B1 * | 6/2014 | Braley | F03D 1/0675 416/226 |
| 8,789,275 | B2 * | 7/2014 | Esaki | F03D 1/0675 29/889.7 |
| 9,421,742 | B2 * | 8/2016 | Grove-Nielsen | B32B 27/00 |
| 9,476,406 | B2 * | 10/2016 | Obrecht | F03D 1/0633 |

(Continued)

FOREIGN PATENT DOCUMENTS

CN 102192109 A 9/2011
CN 103089534 A 5/2013
(Continued)

OTHER PUBLICATIONS

EP Communication pursuant to Article 94(3) EPC for EP patent application No. 14162704.2.
(Continued)

*Primary Examiner* — Logan Kraft
*Assistant Examiner* — Brian Delrue
(74) *Attorney, Agent, or Firm* — Beusse Wolter Sanks & Maire

(57) ABSTRACT

A rotor blade for a wind turbine, having a longitudinal rotor blade base body extending in a longitudinal axis, with the rotor blade base body defining a leading edge and a trailing edge of the rotor blade is provided, wherein the rotor blade base body has a number of panel elements, wherein at least one panel element includes at least one stiffening structure member embedded within the at least one panel element.

17 Claims, 2 Drawing Sheets

(56) References Cited

U.S. PATENT DOCUMENTS

| | | | |
|---|---|---|---|
| 2004/0253114 A1* | 12/2004 | Gunneskov | F03D 1/065 416/224 |
| 2006/0175731 A1* | 8/2006 | Bech | B29C 66/1162 264/259 |
| 2007/0217918 A1* | 9/2007 | Baker | F03D 1/0675 416/227 R |
| 2007/0251090 A1* | 11/2007 | Breugel | B29C 70/30 29/889.7 |
| 2008/0219851 A1* | 9/2008 | Althoff | F03D 1/0675 416/226 |
| 2009/0140527 A1* | 6/2009 | Pawar | F03D 1/0675 290/55 |
| 2009/0169392 A1* | 7/2009 | Kuroiwa | F03D 1/0675 416/241 A |
| 2009/0196756 A1* | 8/2009 | Althoff | F03D 1/0675 416/226 |
| 2010/0132884 A1* | 6/2010 | Baehmann | B29C 66/543 156/293 |
| 2010/0135816 A1* | 6/2010 | Cairo | F03D 1/0675 416/226 |
| 2010/0143146 A1* | 6/2010 | Bell | F03D 1/06 416/233 |
| 2010/0143148 A1* | 6/2010 | Chen | F03D 1/0675 416/241 R |
| 2011/0081514 A1* | 4/2011 | Day | B29C 70/086 428/53 |
| 2011/0142661 A1* | 6/2011 | Sambamurty | F03D 1/0675 416/224 |
| 2011/0142662 A1* | 6/2011 | Fritz | F03D 1/0675 416/226 |
| 2011/0171032 A1* | 7/2011 | Hancock | B25B 11/02 416/223 R |
| 2011/0189025 A1* | 8/2011 | Hancock | B25B 11/02 416/226 |
| 2011/0229331 A1 | 9/2011 | Gunter | |
| 2011/0243750 A1* | 10/2011 | Gruhn | B29B 11/16 416/226 |
| 2011/0254189 A1* | 10/2011 | Doyle | B28B 7/346 264/101 |
| 2011/0262283 A1* | 10/2011 | Hancock | B25B 11/02 416/226 |
| 2012/0027611 A1* | 2/2012 | Yarbrough | F03D 1/0683 416/226 |
| 2012/0087801 A1* | 4/2012 | Driver | B29C 70/34 416/229 R |
| 2012/0141282 A1* | 6/2012 | Esaki | F03D 1/0675 416/224 |
| 2012/0141291 A1* | 6/2012 | Appleton | F01D 11/00 416/241 R |
| 2012/0183408 A1 | 7/2012 | Noerlem | |
| 2012/0219424 A1* | 8/2012 | Lin | F03D 1/0675 416/226 |
| 2013/0056914 A1* | 3/2013 | Frankowski | B29C 70/44 264/571 |
| 2013/0078105 A1* | 3/2013 | Drewes | F03D 1/0675 416/230 |
| 2013/0108454 A1 | 5/2013 | Lind | |
| 2013/0108455 A1* | 5/2013 | Quiring | F03D 1/0675 416/233 |
| 2013/0149153 A1* | 6/2013 | Fujioka | H02G 13/00 416/146 R |
| 2013/0280087 A1* | 10/2013 | Appleton | B29C 44/06 416/241 A |
| 2013/0280088 A1* | 10/2013 | Appleton | F03D 1/0633 416/241 R |
| 2013/0292885 A1* | 11/2013 | Austinat | F03D 11/00 264/571 |
| 2013/0294925 A1* | 11/2013 | Appleton | B29C 70/086 416/241 R |
| 2014/0037455 A1* | 2/2014 | Dahl | F03D 1/0675 416/223 R |
| 2014/0154090 A1* | 6/2014 | Buravalla | F03D 1/001 416/225 |
| 2014/0178205 A1* | 6/2014 | Nanukuttan | B23P 11/00 416/241 R |
| 2015/0152838 A1* | 6/2015 | Merzhaeuser | F03D 1/0675 416/226 |
| 2015/0198051 A1* | 7/2015 | Hayden | B29C 70/84 416/226 |
| 2016/0138569 A1* | 5/2016 | Caruso | F03D 1/0675 416/241 R |
| 2016/0169194 A1* | 6/2016 | Yarbrough | F03D 1/0683 416/226 |
| 2016/0169195 A1* | 6/2016 | Johnson | F03D 1/001 416/204 R |
| 2016/0279890 A1* | 9/2016 | Jespersen | B29C 45/14336 |
| 2016/0348643 A1* | 12/2016 | Fujioka | F03D 1/003 |

FOREIGN PATENT DOCUMENTS

| | | | |
|---|---|---|---|
| DE | 102009003421 A1 | | 8/2009 |
| DE | 102011076082 A | | 11/2012 |
| DE | 102011076082 A1 | | 11/2012 |
| EP | 2402594 A1 | | 1/2012 |
| EP | 2728169 A2 | | 5/2014 |
| EP | 3002452 A1 * | 4/2016 | ........... F03D 1/0675 |
| WO | 2006082479 A1 | | 8/2006 |
| WO | 2009059604 A1 | | 5/2009 |

OTHER PUBLICATIONS

CN search report dated May 31, 2018,f or CN patent application application No. 201510146108.6.

* cited by examiner

ROTOR BLADE FOR A WIND TURBINE

CROSS REFERENCE TO RELATED APPLICATIONS

This application claims the benefit of European Application No. EP14162704 filed Mar. 31, 2014, incorporated by reference herein in its entirety.

FIELD OF INVENTION

The invention relates to a rotor blade for a wind turbine, comprising a longitudinal rotor blade base body extending in a longitudinal axis, with the rotor blade base body defining a leading edge and a trailing edge of the rotor blade, whereby the rotor blade base body comprises a number of panel elements.

BACKGROUND OF INVENTION

The usual construction of a rotor blade for a wind turbine comprises a longitudinal rotor blade base body extending in a longitudinal axis. Typically, the rotor blade base body comprises a number of panel elements connected to each other so as to build the rotor blade base body.

It is known that rotor blades of wind turbines have to withstand high mechanical loads during operation of the wind turbine. The high mechanical loads given under harsh operational conditions of the wind turbine, i.e. particularly under conditions with high wind speeds, gusts, etc. may cause local buckling of the rotor blade base body, i.e. particularly respective panel elements, due to high local load peaks.

Known approaches for providing rotor blades with higher mechanical stability typically employ an extensive increase of additional material, i.e. providing the rotor blade base body, particularly respective panel elements, with higher wall thicknesses. This approach is comparatively costly and therefore, not satisfying.

SUMMARY OF INVENTION

It is an object of the invention to provide a rotor blade with improved mechanical stability.

This object is achieved by a rotor blade as initially mentioned which is characterised in that at least one panel element is provided with at least one stiffening structure member embedded within the at least one panel element.

The rotor blade according to aspects of the invention comprises a longitudinal rotor blade base body extending in a longitudinal axis. The term "longitudinal" means that the major part of the spatial extension of the rotor blade base body follows a first spatial direction, i.e. the direction of the longitudinal or central axis of the rotor blade. The term "longitudinal" does not only embrace rotor blade base bodies having strict straight shapes, but also rotor blade base bodies having at least partially bent or curved shapes.

The rotor blade base body comprises a number of panel elements in a specific spatial arrangement. The panel elements are connected so as to build the rotor blade base body. The panel elements are typically of square or rectangular shape. Yet, other, i.e. particularly complex, shapes are feasible as well.

The rotor blade according to aspects of the invention is provided with improved mechanical stability, i.e. particularly stiffness, by means of at least one stiffening structure member being embedded within at least one panel element.

Of course, a number of respective stiffening structure members may be embedded within a respective panel element. The rotor blade base body may comprise a number of respective panel elements having at least one respective stiffening structure member embedded therein.

Embedding respective stiffening structure members within a respective panel element increases the mechanical stability of the panel element and hence, the mechanical stability of the rotor blade as a whole. By embedding respective stiffening structure members within a respective panel element, a respective panel element is "mechanically divided" in a number of sub panel elements of high mechanical stability locally increasing the mechanical stability of the panel element in comparison to a conventional panel element. In such a manner, the panel element can withstand comparatively high local load peaks. Local deformation, particularly local buckling, of the panel element and the rotor blade, respectively can be avoided.

Embedding means that a respective stiffening structure member is entirely enclosed or entirely integrated within the structure of the panel element. Respective stiffening structure members are typically not visible when regarding a respective panel element. Embedding may therefore, be realised in different ways essentially depending on the concrete constructive design, such as e.g. monolithic constructive design or sandwich-like constructive design, of the panel elements. Hence, respective stiffening structure members may be cast within a casting material building the panel element and/or disposed in between respective outer layers of a sandwich-like constructive design of a panel element, for instance.

Regarding the exemplary embodiment of a panel element comprising a sandwich-like constructive design, i.e. a sandwich-like structure including two outer layers and an inner layer disposed between the two outer layers, it is possible that at least one stiffening structure member is disposed between the two outer layers. Particularly, the at least one stiffening structure member may be provided between respective inner layer elements building the inner layer.

Regarding a respective sandwich-like structure, respective outer layers are typically made of or comprise comparatively stiff materials, such as fibre reinforced composite materials, including reinforcement fibres, e.g. carbon and/or glass fibres, disposed within a matrix material, for instance. Respective inner layers are typically made of or comprise comparatively lightweight materials such as wood, e.g. balsa, or plastic, particularly foamed plastic, for instance. Both the term "outer layer" and the term "inner layer" embraces multi-layered structures.

In either case, it is possible to provide a respective panel element with specific mechanical properties by a concerted arrangement, particularly with regard to orientation and/or position, of respective stiffening structure members embedded within the panel element. In other words, number, dimensions, orientation, position, and shape of respective stiffening structure members embedded within a respective panel element is crucial for the mechanical properties of the panel element and the rotor blade as whole.

Regarding the arrangement of the at least one stiffening structure member embedded within a respective panel element, it is preferred that the at least one stiffening structure member is disposed with an angle relative to the longitudinal axis of the rotor blade and with a longitudinal extension towards the leading edge and/or trailing edge of the rotor blade. This preferred arrangement of the stiffening structure members embedded within the panel element obviously refers to the mounted state of the rotor blade in which a number of respective panel elements are connected so as to build the rotor blade base body defining the leading edge, the trailing edge as well as a suction side and a pressure side of the rotor blade.

Typically, respective stiffening structure members are inclined with an angle in the region of 5-90°, particularly 20-70°, relative to the longitudinal axis of the rotor blade. Respective stiffening structure members, i.e. single stiffening structure members, groups of stiffening structure members, or all stiffening structure members, may be inclined or oriented in direction towards the free end, i.e. the tip, of the rotor blade base body. Of course, other inclinations or orientations are feasible as well.

Provided that the rotor blade comprises at least one stiffening beam extending within or parallel to the longitudinal axis of the rotor blade, the stiffening beam being disposed between at least one leading edge side panel element and at least one trailing edge side panel element, the construction of the rotor blade base body resembles the inner structure of a leaf comprising a number of veins extending off a central petiole. Thereby, the stiffening structure members resemble the veins and the stiffening beam resembles the petiole.

The at least one stiffening structure member typically has a longitudinal, particularly bar- or rod-like, shape. A longitudinal shape generally means that the major part of the spatial extension of the stiffening structure member essentially follows a first spatial direction. Thereby, the term "longitudinal shape" does not only embrace strict straight shapes, but also at least partially bent or curved shapes.

The at least one stiffening structure member comprises at least one portion of circular or rectangular or square or oval or C-shaped or I-shaped or L-shaped cross-section. Hence, stiffening structure members with different cross-sectional shapes are possible. A respective stiffening structure member can have a uniform cross-section, i.e. the cross-section does not change along the length of the stiffening structure member, or a non-uniform cross-section, i.e. the cross-section changes along the length of the stiffening structure member.

Both the concrete outer shape and the cross-sectional shape of the stiffening structure member are typically defined with regard to the concrete shape of the panel element, the rotor blade base body, and respective mechanical loads the rotor blade has to withstand when being attached to a wind turbine. The same applies to the outer dimensions of the stiffening structure member.

The at least one stiffening structure member is typically made of a mechanically stable material and/or a mechanically stable construction. It is preferred that the at least one stiffening structure member is made of metal, particularly steel, and/or a composite material, particularly fibre-reinforced plastic, including a number of reinforcement fibres embedded within a matrix material, i.e. directly enclosed by a matrix material. Respective reinforcement fibres may be carbon or glass fibres, for instance. A respective matrix material may be a resin-like matrix material such as a thermoplastic or thermosetting polymer, or an epoxy- or vinyl-ester-based resin, for instance. Of course, other resin-like materials are applicable as well.

As mentioned above, a respective panel element may be provided with a number of embedded stiffening structure members. The respective stiffening structure members may have the same size and/or shape or different sizes and/or shapes. Hence, it is possible that the at least one panel element or a panel element comprises a number of adjacently disposed stiffening structure members. The adjacently disposed arrangement of respective stiffening structure members embedded within a respective panel element allows for the mentioned division of the panel element in respective sub panel elements.

Adjacently disposed stiffening structure members may have the same, but do not necessarily have to have the same extension towards the leading and/or trailing edge of the rotor blade. Adjacently disposed stiffening structure members may have the same, but do not necessarily have to have the same orientation relative to the longitudinal axis of the rotor blade.

Particularly, adjacently disposed stiffening structure members may be, but do not necessarily have to be in a parallel arrangement. Hence, when regarding a number of, i.e. at least two stiffening structure members, at least two stiffening structure members may be disposed with the same or different angles relative to the longitudinal axis of the rotor blade.

As has been mentioned, adjacently disposed stiffening structure members may have, but do not necessarily have to have the same extension towards the leading and/or trailing edge of the rotor blade. Hence, when regarding a number of, i.e. at least two stiffening structure members, at least two stiffening structure members may have the same or different longitudinal extensions towards the leading and/or trailing edge of the rotor blade.

It has also been mentioned that the rotor blade base body is typically built by connecting respective panel elements. Thereby, it is preferred that respective panel elements are connected by embedding in a matrix material so as to build the rotor blade base body. Typically, the matrix material fixes the orientation and position of the stiffening structure members embedded within the panel elements. The matrix material, which may be a thermosetting polymer, e.g. an epoxy- or vinyl-ester-based resin, therefore, may serve in terms of an adhesive within respective panel elements and between respective panel elements.

The invention also relates to a wind turbine, comprising at least one rotor blade according the invention. Hence, all annotations concerning the rotor blade according to the invention also apply to the wind turbine according to the invention.

BRIEF DESCRIPTION OF THE DRAWINGS

In the following, the invention is described in detail with reference to specific embodiments and with reference to figures, wherein FIG. 1 a shows principle drawing of a perspective view of a rotor blade according to an exemplary embodiment of the invention.

DETAILED DESCRIPTION OF INVENTION

Figure 1:
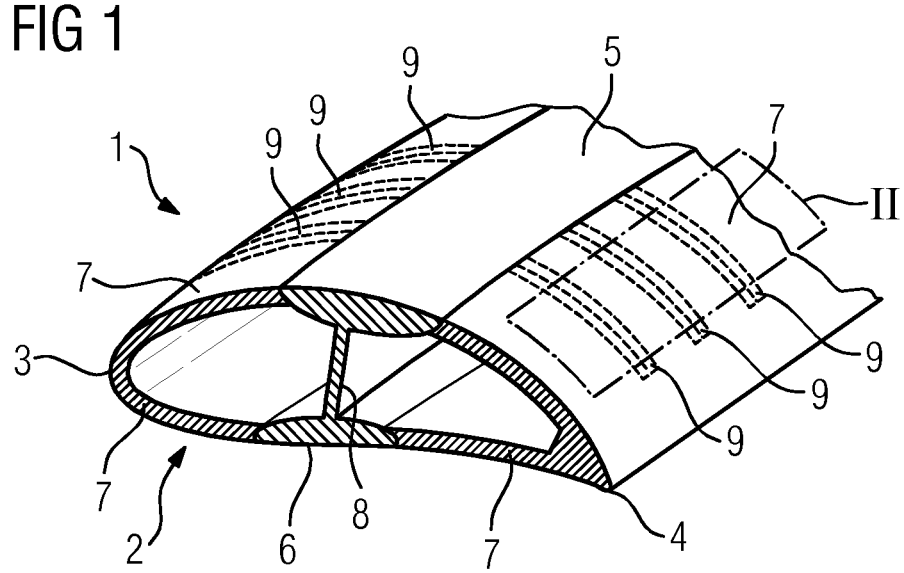

FIG. 1 shows a principle drawing of a perspective view of a rotor blade 1 according to an exemplary embodiment of the invention. The rotor blade 1 is to be attached to a rotor hub of a wind turbine (both not shown). As is discernible, FIG. 1 only shows a certain portion of the rotor blade 1 which is sufficient for outlining the principle according to the invention.

The rotor blade 1 comprises a longitudinal rotor blade base body 2 defining a leading edge 3, a trailing edge 4 as well as a suction side 5 and a pressure side 6 of the rotor blade 1. The rotor blade base body 2 extends in longitudinal direction, i.e. in direction of the longitudinal axis A of the rotor blade 1.

The rotor blade base body 2 comprises a number of panel elements 7 and a central stiffening beam 8 having an I-shaped cross-section. The central stiffening beam 8 extends within the longitudinal axis A of the rotor blade 1 and is disposed between respective leading edge side panel elements 7 and respective trailing edge side panel elements 7. The central stiffening beam 8 is the main load carrying member of the rotor blade 1.

The panel elements 7 and the central stiffening beam 8 are connected so as to build the rotor blade base body 2. Connection of the panel elements 7 and the central stiffening beam 8 is realised by a resin-like matrix material, i.e. particularly an epoxy-based resin, enclosing the panel elements 7 and the central stiffening beam 8.

As is discernible, stiffening structure members 9 are embedded within the panel elements 7. Particularly, a specific number of stiffening structure members 9 are embedded within a respective panel element 7. The stiffening structure members 9 provide a respective panel element 7 with increased mechanical stability, i.e. particularly locally increased stiffness. The stiffening structure members 9 are dotted which indicates that they are embedded within the panel elements 7.

The stiffening structure members 9 have a longitudinal, i.e. particularly bar-like, shape and are disposed with an angle α relative to the longitudinal axis A of the rotor blade 1. The stiffening structure members 9 have a longitudinal extension towards the leading edge 3 and/or trailing edge 4 of the rotor blade 1.

The stiffening structure members 9 are made of a mechanically stable material such as a carbon-fibre reinforced composite material including a number of carbon-fibres of specific length and orientation embedded within a resin-like matrix material, e.g. an epoxy-based matrix material, for instance.

It has been determined that embedding respective stiffening structure members 9 made of carbon-fibre reinforced composite material within respective panel elements 7 leads to an extensive local increase in stiffness. Hence, the provision of respective stiffening structure members 9 embedded within respective panel elements 7 allows for an optimised material utilisation, i.e. particularly the use of thinner panel elements 7.

Figure 2:
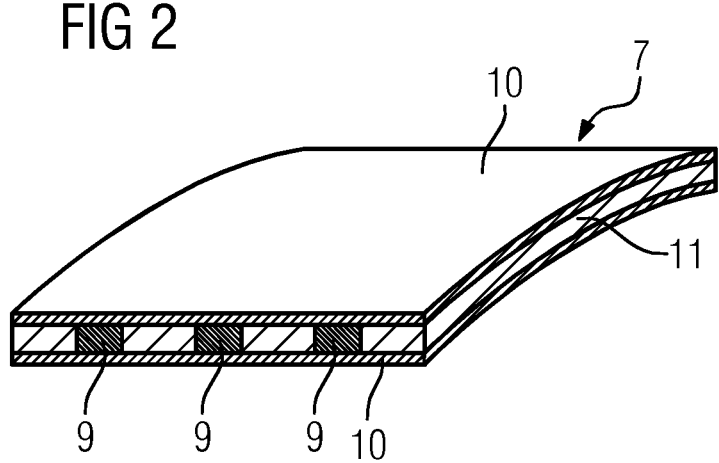
FIG. 2 shows an enlarged view of cut section II in FIG. 1.

FIG. 2 shows an enlarged view of the cut section II in FIG. 1. Thereby, the sandwich-like construction of the panel element 7 is discernible. The sandwich-like construction of the panel element 7 includes two outer layers 10 and in inner layer 11 disposed in between the outer layers 10. The outer layers 10 are made of a comparatively stiff material, such as a fibre reinforced composite material including reinforcement fibres disposed within a matrix material. The inner layer 11 is made of a comparatively lightweight material such as wood, e.g. balsa, or plastic, particularly foamed plastic. Respective stiffening structure members 9 are provided within the inner layer 11, i.e. they are disposed between respective inner layer elements building the inner layer 11.

FIG. 2 also shows that embedded stiffening structure members 9 do not extend off the surface of the panel element 7, but are embedded within the panel element 7.

Figure 3:
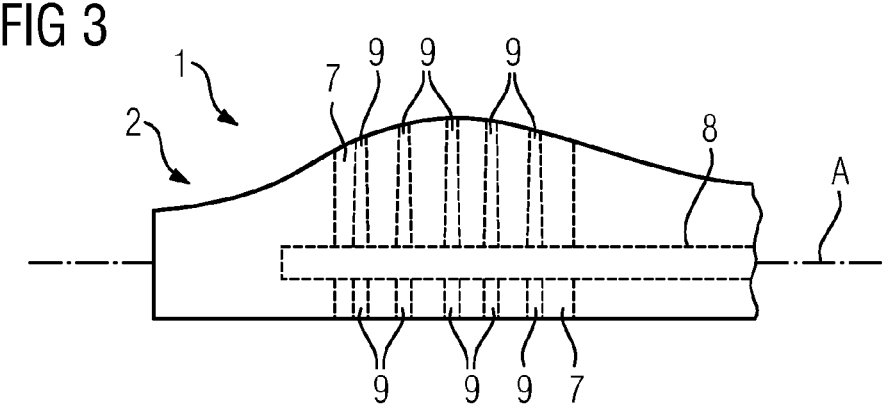
FIG. 3-5 each show a principle drawing of a top view of a rotor blade according to an exemplary embodiment of the invention.
Figure 4:
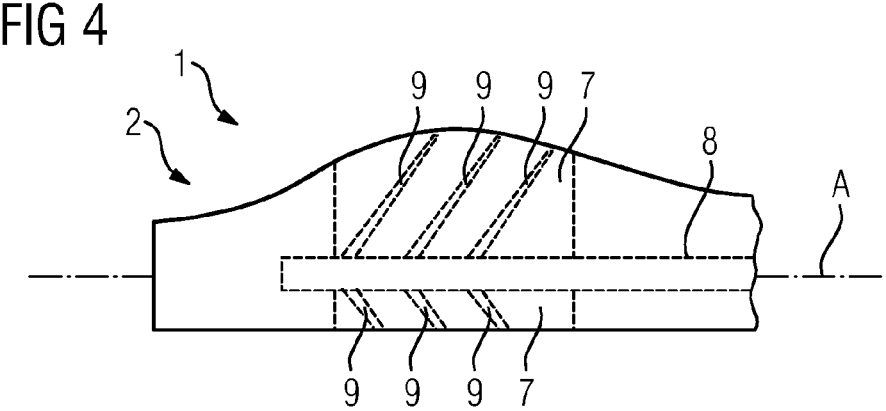
Figure 5:
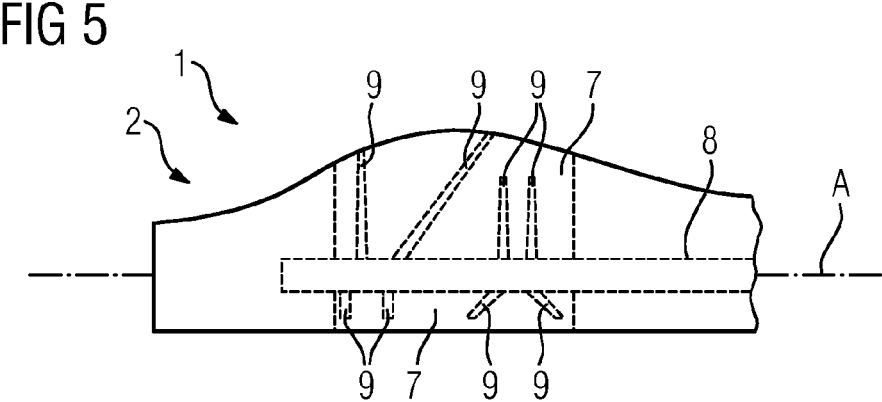

FIG. 3-5 each show a principle drawing of a top view of a rotor blade 1 according to an exemplary embodiment of the invention. Components of the rotor blade 1 which are not visible from the outside are dotted, i.e. particularly stiffening structure members 9, which indicates that they are embedded within the panel elements 7.

FIG. 3-5 demonstrate that respective stiffening structure members 9 may be provided with different orientations, i.e. with different angles α relative to the longitudinal axis of the rotor blade 1.

Thereby, the orientation, i.e. the angles α of respective stiffening structure members 9 relative to the longitudinal axis A of the rotor blade 1, may vary within a single panel element 7 and/or adjacently disposed panel elements 7 disposed along the longitudinal axis A of the rotor blade 1 (cf. FIG. 5).

The same applies to the dimensions, i.e. particularly length, of respective stiffening structure members 9; FIG. 5 shows stiffening structure members 9 of different lengths and therefore, different extensions towards the leading edge 3 and/or trailing edge 4 of the rotor blade 1.

Generally, panel elements 7 with embedded stiffening structure members 9 can be customised using constructive parameters such as cross-sectional area, cross-sectional shape, dimensions, spacing, etc.

Manufacturing or respective panel elements 7 with embedded stiffening structure members 9 is comparatively easy since the stiffening structure members 9 may be placed in a mould for manufacturing a rotor blade 1 while placing respective layers, i.e. particularly inner layers 10, of a respective panel element 7. The matrix material connecting the panel elements 7 also fixes the orientation and position of the stiffening structure members 9 embedded within respective panel elements 7.

Although the present invention has been described in detail with reference to the preferred embodiment, the present invention is not limited by the disclosed examples from which the skilled person is able to derive other variations without departing from the scope of the invention.

The invention claimed is:

1. A rotor blade for a wind turbine, comprising:
a rotor blade base body extending in a longitudinal axis, with the rotor blade base body defining a leading edge and a trailing edge of the rotor blade, wherein the rotor blade base body comprises: a skin comprising a number of panel elements; and a central stiffening beam extending in a spanwise direction of the rotor blade,
wherein at least one panel element of the number of panel elements comprises a first outer layer that defines an external surface of the skin, a second outer layer that defines an internal surface of the skin, a plurality of inner layer elements sandwiched between and bonded to the first outer layer and the second outer layer, and a plurality of stiffening structure members sandwiched between and bonded to the first outer layer and the second outer layer and sandwiched between and bonded to the plurality of inner layer elements,
wherein each stiffening structure member of the plurality of stiffening structure members is discrete, and
wherein each stiffening structure member of the plurality of stiffening structure members is oriented to extend from the central stiffening beam such that a respective free end thereof or an extension from the respective free end traverses the trailing edge or the leading edge.

2. The rotor blade according to claim 1,
wherein at least one stiffening structure member of the plurality of stiffening structure members is disposed with an angle relative to the longitudinal axis of the rotor blade and with a longitudinal extension towards at least one of the leading edge and the trailing edge of the rotor blade.

3. The rotor blade according to claim 1,
wherein at least one stiffening structure member of the plurality of stiffening structure members comprises a longitudinal shape.

4. The rotor blade according to claim 1,
wherein at least one stiffening structure member of the plurality of stiffening structure members comprises at least one portion of circular or rectangular or square or oval or C-shaped or I-shaped or L-shaped cross-section.

5. The rotor blade according to claim 1,
wherein at least one stiffening structure member of the plurality of stiffening structure members is made of at least one of a metal and a composite material including a number of reinforcement fibers embedded within a matrix material.

6. The rotor blade according to claim 5,
wherein the metal comprises steel and the composite material comprises fiber-reinforced plastic.

7. The rotor blade according to claim 1,
wherein at least two stiffening structure members of the plurality of stiffening structure members are disposed with the same or different angles relative to the longitudinal axis of the rotor blade.

8. The rotor blade according to claim 1,
wherein at least two stiffening structure members of the plurality of stiffening structure members have the same or different longitudinal extensions towards at least one of the leading edge and the trailing edge of the rotor blade.

9. The rotor blade according to claim 1,
wherein respective panel elements of the number of panel elements are embedded within a matrix material so as to build the rotor blade base body.

10. The rotor blade according to claim 1,
wherein the number of panel elements comprises: at least one leading edge side panel element comprising a respective first outer layer, a respective second outer layer, and a respective inner layer sandwiched between and bonded to the respective first outer layer and the respective second outer layer; and at least one trailing edge side panel element comprising a respective first outer layer, a respective second outer layer, and a respective inner layer sandwiched between and bonded to the respective first outer layer and the respective second outer layer, and
wherein the central stiffening beam is disposed between the at least one leading edge side panel element and the at least one trailing edge side panel element.

11. A wind turbine, comprising at least one rotor blade according to claim 1.

12. The rotor blade according to claim 1,
wherein at least one stiffening structure member of the plurality of stiffening structure members comprises a bar-like shape.

13. The rotor blade of claim 1, wherein the first outer layer and the second outer layer each comprise reinforcement fibers embedded within a matrix material,
wherein inner layer elements of the plurality of inner layer elements comprise wood or plastic, and
wherein stiffening structure members of the plurality of stiffening structure members comprise at least one of a metal and a composite material comprising a plurality of reinforcement fibers embedded within the matrix material.

14. The rotor blade of claim 1, wherein stiffening structure members of the plurality of stiffening structure members extend upward from the central stiffening beam toward a tip of the rotor blade.

15. A rotor blade for a wind turbine, comprising:
a rotor blade base body defining a leading edge and a trailing edge of the rotor blade, wherein the rotor blade base body comprises a skin comprising a plurality of panel elements and a central stiffening beam extending in a spanwise direction of the rotor blade,
at least one panel element of the plurality of panel elements that comprises a first outer layer that defines an external surface of the skin, a second outer layer that defines an internal surface of the skin, a plurality of inner layer elements sandwiched between and bonded to the first outer layer and the second outer layer, and an arrangement of stiffening structure members sandwiched between and bonded to the first outer layer and the second outer layer and sandwiched between and bonded to the plurality of inner layer elements herein,
a plurality of leading stiffening structure members of the arrangement of stiffening structure members that originate at respective and different spanwise locations along the central stiffening beam and extend, discrete from any other stiffening structure members of the arrangement of stiffening structure members, toward the leading edge, and
a plurality of trailing stiffening structure members of the arrangement of stiffening structure members that originate at respective and different spanwise locations along the central stiffening beam and extend, discretely from any other stiffening structure members of the arrangement of stiffening structure members, toward the trailing edge.

16. The rotor blade according to claim 15, wherein at least two of the plurality of leading stiffening structure members are not parallel to each other.

17. The rotor blade according to claim 15, wherein at least two of the plurality of trailing stiffening structure members are not parallel to each other.

* * * * *